(12) United States Patent
Mani et al.

(10) Patent No.: US 8,955,079 B2
(45) Date of Patent: Feb. 10, 2015

(54) SINGLE SIGN-ON FOR APPLICATIONS

(75) Inventors: Mahalingam Mani, Cupertino, CA (US); David Ahrens, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 122 days.

(21) Appl. No.: 13/285,388

(22) Filed: Oct. 31, 2011

(65) Prior Publication Data
US 2013/0111573 A1 May 2, 2013

(51) Int. Cl.
*H04L 29/06* (2006.01)

(52) U.S. Cl.
CPC .......... *H04L 63/0815* (2013.01); *H04L 63/168* (2013.01)
USPC .................................. 726/8; 726/6

(58) Field of Classification Search
CPC ............ H04L 63/0815; H04L 63/0853; H04L 63/168
USPC ......................................... 726/6, 8
See application file for complete search history.

(56) References Cited

U.S. PATENT DOCUMENTS

| | | | |
|---|---|---|---|
| 6,651,168 B1 * | 11/2003 | Kao et al. | 713/185 |
| 6,826,696 B1 | 11/2004 | Chawla et al. | |
| 8,255,984 B1 * | 8/2012 | Ghostine et al. | 726/8 |
| 8,601,482 B2 * | 12/2013 | Bussard et al. | 718/104 |
| 2004/0098609 A1 * | 5/2004 | Bracewell et al. | 713/200 |
| 2004/0123144 A1 * | 6/2004 | Chan et al. | 713/201 |
| 2007/0245356 A1 * | 10/2007 | Ari et al. | 719/319 |
| 2008/0168545 A1 * | 7/2008 | Inoue et al. | 726/6 |
| 2009/0222534 A1 * | 9/2009 | Kitada | 709/217 |
| 2009/0262668 A1 * | 10/2009 | Hemar et al. | 370/260 |
| 2011/0099283 A1 * | 4/2011 | Park et al. | 709/230 |

OTHER PUBLICATIONS

Zhu, "Single Sign-on Assistant an Authentication Broker for Web Applications", 2010, IEEE, p. 146-149.*
Extended Search Report for European Patent Application No. 12185501.9, dated Jan. 24, 2013 6 pages.

* cited by examiner

*Primary Examiner* — Thanhnga B Truong
*Assistant Examiner* — Gregory Lane
(74) *Attorney, Agent, or Firm* — Sheridan Ross P.C.

(57) ABSTRACT

Methods and systems for facilitating sign-on procedures in connection with a converged system are provided. An authentication plug-in operates to receive authentication credentials in connection with a request to access an application by a client. The authentication plug-in is capable of operating in different contexts in a converged system. After an initial sign-on, subsequent sign-on requests can be fulfilled by accessing authentication credentials stored in a cache.

20 Claims, 5 Drawing Sheets

SINGLE SIGN-ON FOR APPLICATIONS

FIELD

The invention relates to providing a single sign-on for different applications. More particularly, methods and systems providing a single sign-on with respect to applications associated with different protocols are provided.

BACKGROUND

Unified communications systems provide a user with a simultaneous view of communications conducted using different protocols and/or applications. For example, unified communications can include the use of Internet based applications and session initiation protocol based applications. Each of the different protocols require users to authenticate when accessing associated applications. In particular, every application can challenge a user for a valid user name and password when the application is accessed. However, requiring that a user provide such information when each application is accessed is cumbersome and time consuming.

In order to streamline the authentication process, token based mechanisms exist. Such mechanisms can include the use of secure token servers that provide a back end authentication function for hypertext transfer protocol (HTTP) based applications. After an initial sign-on procedure has been completed, the token server can provide an authentication token in connection with other HTTP applications on that server. Moreover, other servers in the same domain requiring authentication in connection with associated applications can obtain a token from the authentication server. Accordingly, HTTP applications can be accessed by a client without requiring that the user re-enter their credentials, after that client has supplied one instance of a user name and password pair.

However, the authentication process for session initiation protocol (SIP) applications is different. Accordingly, where a client desires access to one or more SIP applications, additional authentication procedures must be followed. More particularly, previous solutions for providing a single sign-on with respect to HTTP applications cannot also perform authentication with respect to SIP applications. Specifically, existing SIP servers and clients are incapable of accepting the tokens used by web authentication processes. In addition, solutions for providing a single sign-on in connection with SIP based applications are not recognized by web based applications. Accordingly, an integrated solution, capable of providing a single sign-on with respect to HTTP and SIP based applications is not available using previous techniques.

SUMMARY

According to embodiments of the present disclosure, systems and methods for providing a single sign-on in connection with applications associated with different protocols are provided. More particularly, the disclosed invention provides a single sign-on for both web or hypertext transfer protocol (HTTP) based and session initiation protocol (SIP) based applications. The present disclosure describes a plug-in that provides a converged authentication mechanism and process.

In accordance with at least some embodiments, an authentication plug-in is provided as part of a server providing web-based and SIP based applications. In this intra platform embodiment, a request by a client for access to either a web application or a SIP application results in a challenge or request for credentials from the client. The provided credential information is received by the plug-in on the server. Where the application that the client seeks to access is a web application, the realm, domain, and identity of the client requesting access is validated against the user name. Where the client seeks to access a SIP application, the realm, domain, and identity of the client requesting access is validated against the address of record (AoR). More particularly, the plug-in on the server performs validation using the provided credentials as appropriate for the context of the requested application (i.e., HTTP or SIP). Therefore, a subsequent request for an application in a context different than the context in which the original application was requested can be handled by the plug-in, without requiring that the client provide additional authentication information or credentials. Moreover, by providing a plug-in that is application aware, the required information can be provided to enable the requested access, whether the access is for a web or SIP application.

In other embodiments, the provision of a plug-in associated with a server can be extended to an inter platform arrangement. More particularly, multiple servers can each be provided with an authentication plug-in. In such an arrangement, an initial request for access to an application on a server results in the client being queried for credential information. Following a successful authentication, the credential or sign-on information remains available for subsequent requests. More particularly, the authentication credentials provided in connection with the first request are cached by the plug-in associated with the first server. In response to a second request for access to an application made by the client to a second server, a plug-in on the second server within a federation of servers (i.e., in the same domain) receives the credential information from the plug-in on the first server as an opaque parameter containing the required authentication information. Based on that authentication information, the plug-in on the second server validates the second request for access. Moreover, that second request can be for an application in the same or a different context than the application that was subject to the first request. Accordingly, access to the second application is granted based on the original sign-on or authentication procedure performed by the client.

In accordance with still other embodiments, authentication to applications in different contexts and associated with different servers can be provided following a single sign-on procedure by the client using an authentication plug-in that is associated with the client. In particular, integrated authentication is performed by soliciting credentials from the client only once, for a web application or a SIP application, whichever comes first. Those credentials are then reused for other requests for access. Moreover, the different requests can be for access to applications in different contexts. In this client oriented configuration, the authentication plug-in preserves the context of the original request, and preserves that context for subsequent use.

With respect to any of the embodiments, an authentication plug-in is provided to collect credential information and to present that credential information as appropriate for the context of a request for access by the client. More particularly, formatting differences with respect to the digest authentication protocol for web-based or SIP based applications are handled. Moreover, for subsequent requests for access, a challenge for client credentials occurs, but is handled by the authentication plug-in, thereby hiding that challenge from the client. As a result, single sign-on is achieved across applications in different contexts.

Additional features and advantages of embodiments of the present disclosure will become more readily apparent from the following description, particularly when taken together with the accompanying drawings.

DETAILED DESCRIPTION

Figure 1:
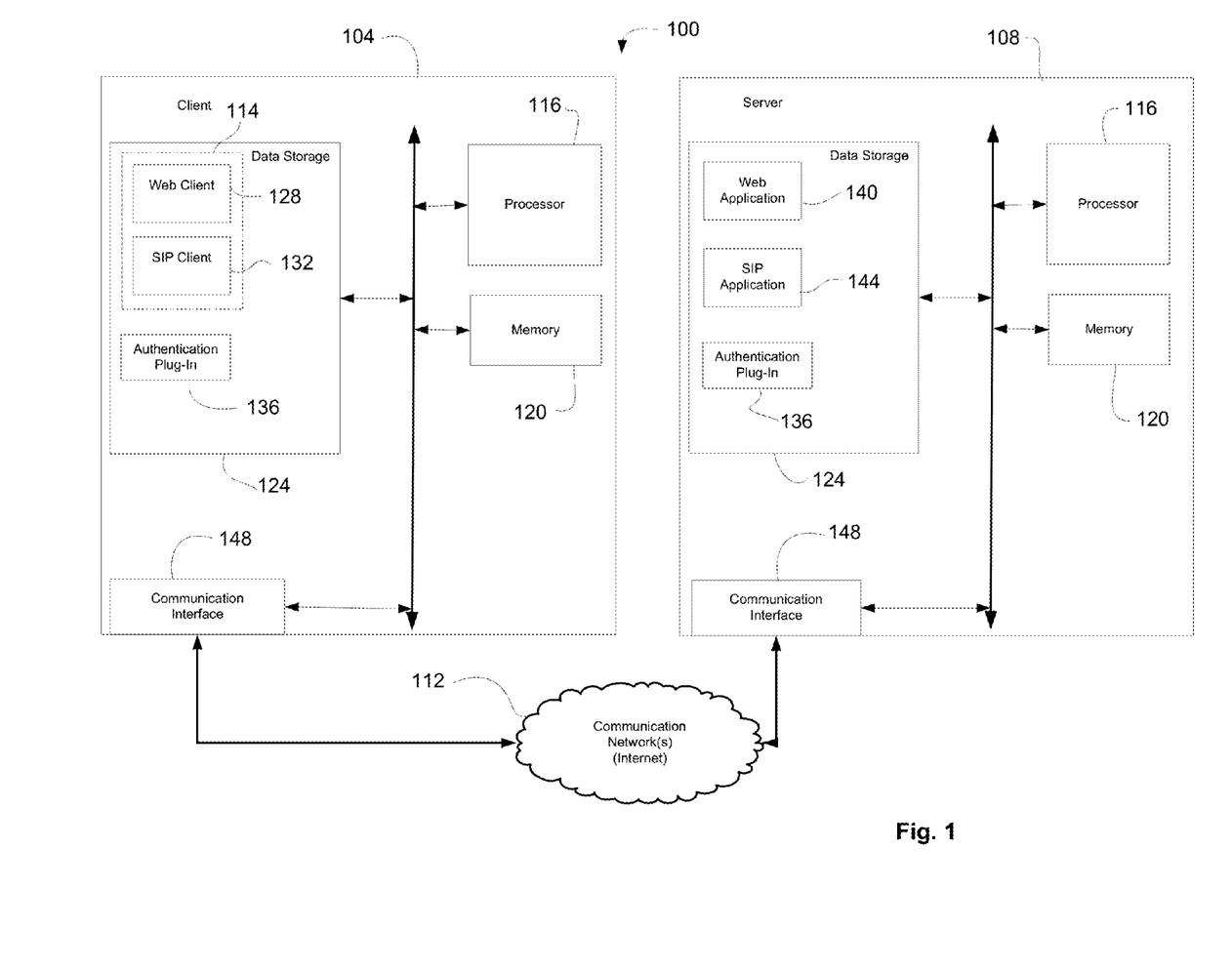
FIG. 1 depicts components of a system in accordance with embodiments of the present disclosure.

FIG. 1 illustrates an exemplary system 100 in accordance with embodiments of the present disclosure. In general, the system 100 includes a client device 104 and a server 108. The client device 104 is in communication with the server 108, for example through a communication network or networks 112. The client device 104 can provide a hardware platform on which a software client 114 that accesses applications available from the server 108 is resident. Alternatively, the client device 108 can allow a user to access a software client 114 resident on some other device. A system 100 can include multiple client devices 104. In addition, although a single server 108 is shown in FIG. 1, it will become apparent to one of skill in the art after consideration of the present disclosure that various embodiments of a system 100 in accordance with the present disclosure include multiple servers 108.

A client device 104 and server 108 each generally include or are associated with various components. These components can include a processor 116. The processor 116 can comprise a general purpose programmable processor or controller for executing application programming or instructions. As a further example, the processor 116 may comprise a specially configured application specific integrated circuit (ASIC) or other integrated circuit, digital signal processor, hardwired electronic or logic circuit such as a discrete element circuit, programmable logic device or gate array, such as a PLD, PLA, FPGA, PAL, special purpose computer or the like. The processor 116 generally functions to run programming code or instructions implementing various functions of the client device 104 or server 108.

The client device 104 and server 108 also generally include memory 120 for use in connection with the execution of application programming by the processor 116, and for the temporary or long term storage of program instructions and/or data. As examples, the memory 120 may comprise RAM, SDRAM, or other solid state memory. Alternatively or in addition, data storage 124 may be provided. In accordance with embodiments of the present disclosure, data storage 124 can contain programming code or instructions implementing various of the applications, functions, or modules executed or provided by the client device 104 or server 108.

In connection with a client device 104, data storage 124 can contain a web client 128. The web client 128 can provide or facilitate access to a user associated with a client device 104 to various web-based applications. The data storage 124 associated with a client device 104 can additionally include a session initiation protocol (SIP) client 132. The SIP client 132 can provide or facilitate access to various SIP applications on behalf of a user associated with the client device 104. Additionally, in accordance with at least some embodiments, the data storage 124 associated with a client device 104 can include an authentication plug-in 136. In particular, as described in greater detail elsewhere herein, an authentication plug-in 136 included in data storage 124 associated with a client device 104 can function to provide single sign-on functionality in connection with at least embodiments of the present disclosure in connection with multiple servers 108 within a domain. More particularly, the authentication plug-in 136 can determine the context of a request for access to an application, and can place the received authentication credentials in a cache established in the data storage 124 or elsewhere. In accordance with other embodiments, the data storage 124 associated with a client device 104 need not include an authentication plug-in 136.

In connection with data storage 124 included in a server 108, one or more web applications 140 may be included. In general, web applications 140 can be provided by the server 108 to client devices 104 presenting credentials. Moreover, a web application 140 is provided in connection with the hypertext transfer protocol (HTTP) standards. The data storage 124 associated with a server 108 can additionally include one or more SIP applications 144. The SIP applications 144 can be made available to a client device 104 presenting suitable authentication information. In particular, a SIP application 144 can be provided to a user of a client device 104 in association with SIP standards. Accordingly, a server 108 can comprise a source of converged or universal connectivity (UC) services or applications. The web 140 and SIP 144 applications are generally configured to require the same authentication credentials and methods in the different contexts, except that the parameters are validated against the user name for the web applications 140 and against the address of record for the SIP applications 144. Accordingly, the applications 140 and 144 can grant access in response to receiving common credential information to support the single sign-on feature, while operating within their native context. In accordance with at least some embodiments of the present disclosure, the data storage 124 associated with a server 108 additionally includes an authentication plug-in 136. As with an authentication plug-in 136 associated with a client device 104, an authentication plug-in 136 associated with a server 108 provides single sign-on functionality to a user of a client device 104 for both web 140 and SIP 144 based applications. More particularly, the authentication plug-in 136 can determine the context of a request for access to an application, and can place the received authentication credentials in a cache established in the data storage 124 or elsewhere.

A communication interface 148 is also included in a client device 104 and a server 108. In general, the communication interface 148 facilitates the interconnection of the associated client 108 or server 108 to the communication network 112, to support communications between devices, for example between a client device 104 and a server 108 or between servers 108, including the communication of authentication challenges and credentials in response to such challenges as described herein.

Figure 2:
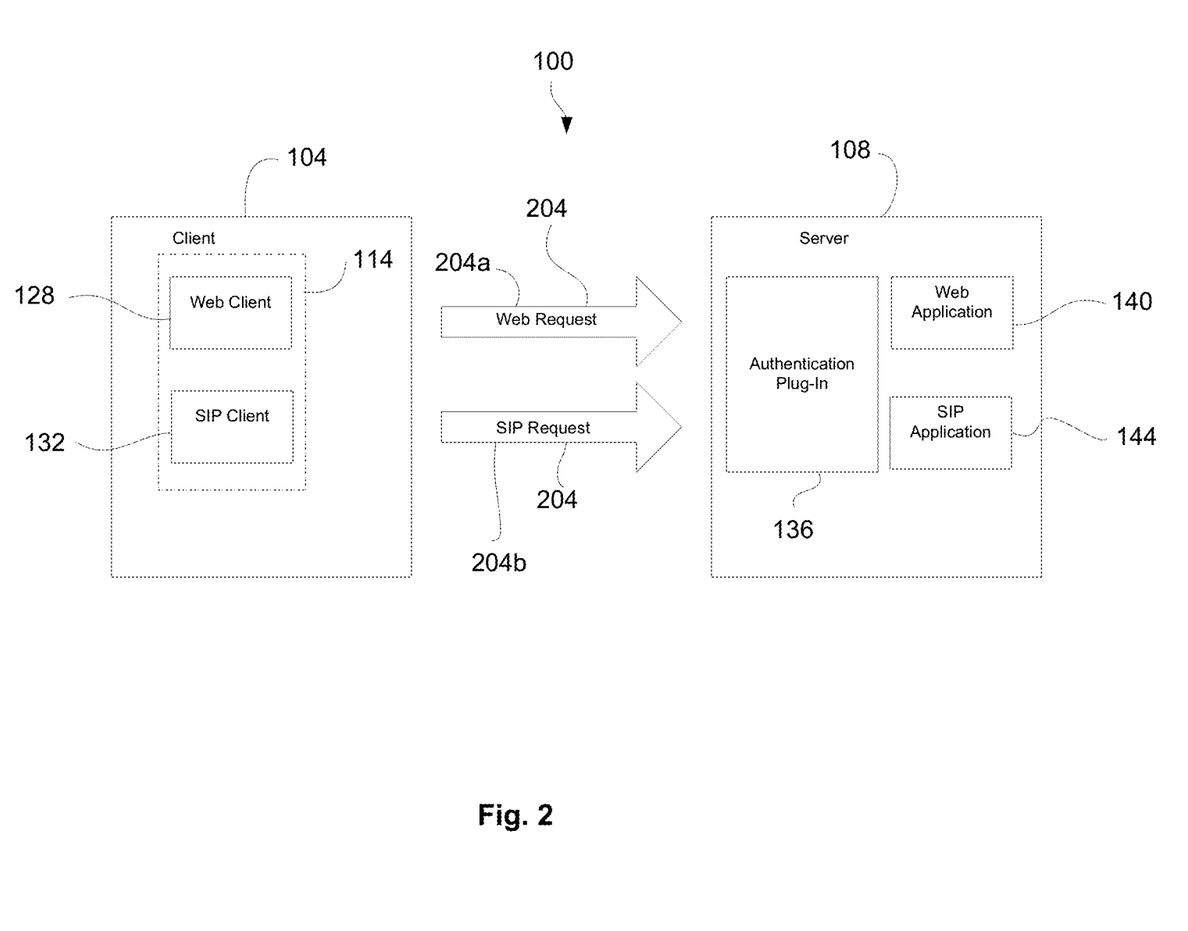
FIG. 2 depicts an authentication arrangement in accordance with an intra platform embodiment.

FIG. 2 depicts an authentication arrangement in accordance with an intra platform embodiment of a system 100 in accordance with embodiments of the present disclosure. More particularly, the system 100 depicted in FIG. 2 provides a single authentication context in which the authentication methods for HTTP, simple object access protocol (SOAP) and SIP applications all have one authentication context. Moreover, embodiments of the present disclosure use an authentication layer based on the Java authentication and authorization service (JAAS) to converge the digest authentication methods for the different application contexts. As shown, the client device 104 includes a web client 128 and a SIP client 132. However, the client device 104 does not include an authentication plug-in in this embodiment. In connection with a request for access 204. The request for access can be either a web request 204a or a SIP request 204b, depending on whether the request is on behalf of the web client 128 or the SIP client 132. The server 108 includes one or more web applications 140 and one or more SIP applications 144. In addition, in this embodiment, the server 108 includes an authentication plug-in 136. The authentication plug-in 136 receives the request 204 from the client device 104 and handles authentication of the client device 104 with respect to the request 204. As can be appreciated by one of skill in the art after consideration of the present disclosure, the authentication process can include issuing a challenge to the client device 104 to provide credential or authentication information. In accordance with further embodiments, credentials can be provided as part of the request 204. Authentication is performed with various information related to the client device 104 and the request 204 being validated against different other parameters, depending on the context in which the request 204 is made. For example, for a web request 204a, seeking access to a web application 140 on behalf of a client device 104, the realm, domain and identities associated with the request 204a are validated against the user name. As a further example, where a SIP request 204b, seeking access to a SIP application 144 on behalf of a SIP client 132 associated with the client device 104 is made, the realm, domain and identity of the client device 104 and/or SIP client 132 are validated against the address of record. In accordance with embodiments of the present disclosure, challenges issued by the authentication plug-in 136 on the server 108 are application aware in order to allow for access requests 204 in response to the challenges to carry "HTTP/1.1" in an HTTP header and to carry "SIP 2.0" in a SIP header while being able to map either to the same context. The credentials and associated client device 104, or client software 114 parameters are cached by the authentication plug-in 136. Accordingly, while an initial request follows normal, container-based authentication processes, a subsequent request for credentials can be handled by the authentication plug-in 136 on the server 108, without requiring that the client device 104 provide a response to subsequent challenges for authentication credentials made in connection with requests for access to other applications 140 or 144 be obtained from the user of the client device 104, regardless of the context of the later applications 140, 144.

Figure 3:
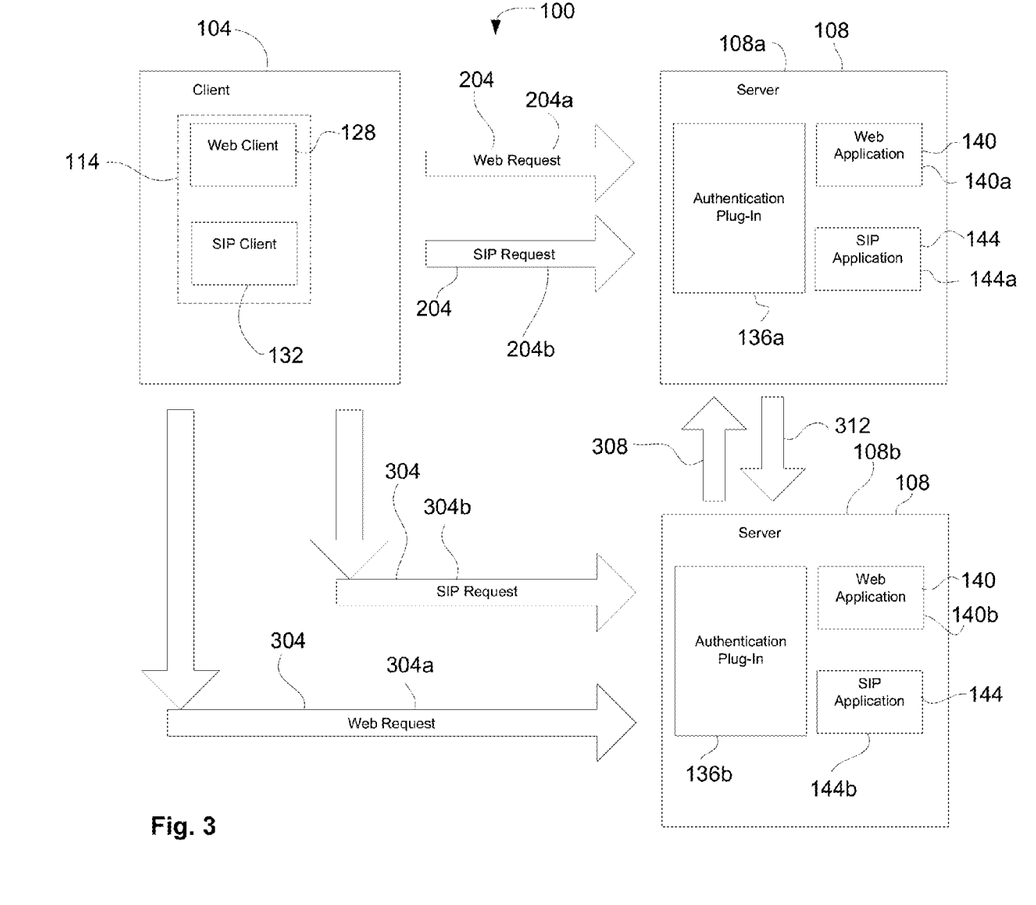
FIG. 3 depicts an authentication arrangement in accordance with an inter platform embodiment.

FIG. 3 depicts an authentication arrangement in an inter platform embodiment of the system 100. In this embodiment, the client device 104 again includes a web client 128 and a SIP client 132. Moreover, the client device 104 is not required to include an authentication plug-in 136. A first server 108a includes a first authentication plug-in 136a, a first web application or set of web applications 140a, and a first SIP application or set of SIP applications 144a. As in the configuration illustrated in connection with FIG. 2, a request 204 from a client device 104 can be made in connection with a request for access to a web application 140a or a SIP application 144a residing or available through the server 108a. Moreover, the request can comprise a web request 204a where it is made on behalf of the web client 128, or a SIP request 204b, where it is made on behalf of the SIP client 132. In addition, handling of the request 204 by the authentication plug-in 136a is the same as in the embodiment described in connection with FIG. 2, in that container-based authentication is performed and implemented in an application, in order to collect and provide appropriate authentication information with respect to requests 204 for access to an application 140a or 144a subsequent to the initial request, regardless of whether the subsequent request is in the same or a different context as the original request.

In the embodiment depicted in FIG. 3, the system 100 additionally includes a second server 108b that includes a web application or set of web applications 140b and a SIP application or set of SIP applications 144b. In addition, the second server 108b includes a second authentication plug-in 136b. Moreover, in the depicted arrangement, the client device 104 makes a second request 304 for access to an application 140 or 144 available from or in association with the second server 108b. The second request 304 can be a web request 304a where the request seeks access to a web application 140b on behalf of the web client 128, or a SIP request 304b where the request is for access to a SIP application 144b on behalf of the SIP client 132. Accordingly, while the first request 204 is made to a container associated with the first server 108a, the second request 304 is made to a second container associated with the second server 108b. The request 304 includes a reference to the initial authenticator issued with respect to the first request 204 to the first container. This reference can be carried by an opaque field contained in the second request 304. The second authentication plug-in 136b running on the second server 108b can use this reference to the first container to issue a query 308 to the first authentication plug-in 136a. The first authentication plug-in 136a then provides a response 312 to the second authentication plug-in 136b, containing the credentials required to provide the requested access to the web application 140b or SIP application 144b associated with the second server 108b. In accordance with further embodiments, the authentication information can be digitally signed by providing the opaque information referencing the original container in the form of a server sign hash of the authorization header. Accordingly, single sign-on functionality can be provided across multiple platforms (i.e., servers 108a and 108b), in addition to across multiple contexts (i.e., HTTP and SIP).

Figure 4:
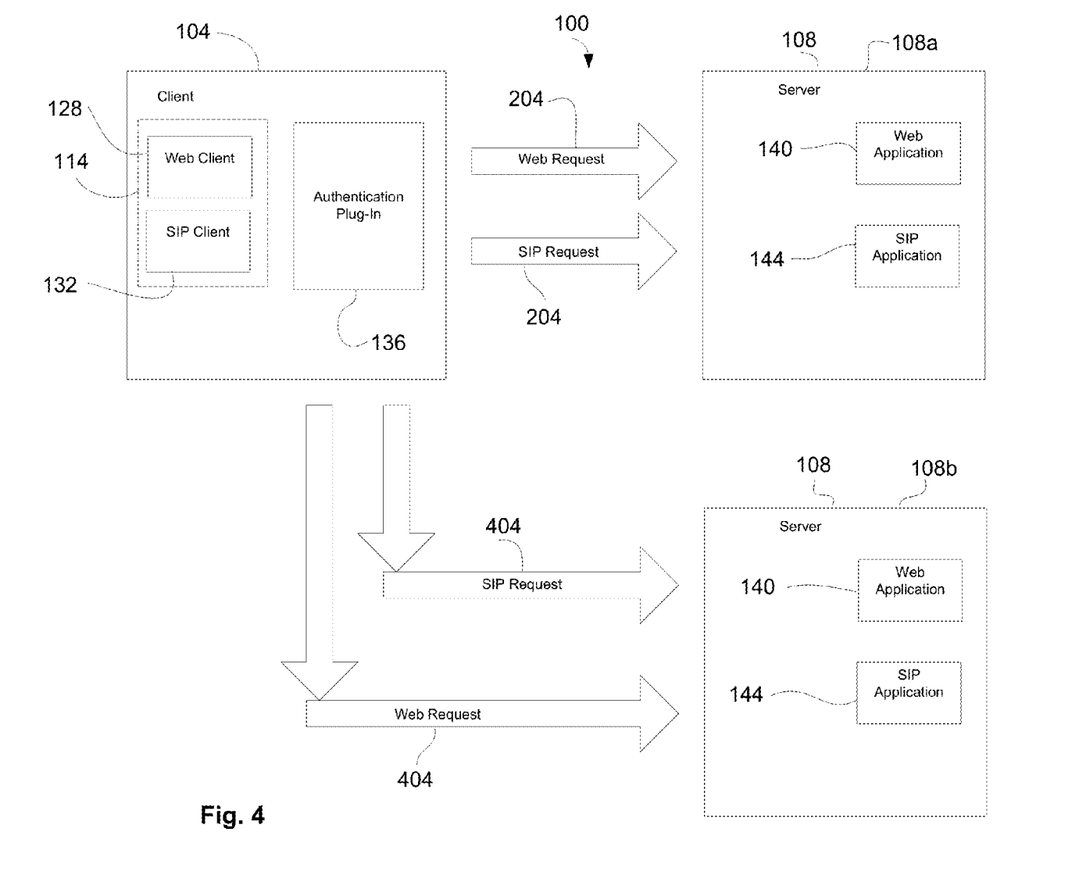
FIG. 4 depicts an authentication arrangement in accordance with an inter platform and intra domain embodiment.

FIG. 4 depicts an authentication arrangement in accordance with an inter platform and intra domain embodiment of a system 100. In this embodiment, the client device 104 includes a web client 128 and a SIP client 132. In addition, the client includes an authentication plug-in 136. The client device 104 can be in communication with one or more servers 108. For instance, in the depicted arrangement, a first server 108a and a second server 108b are included. Each of the servers 108 includes one or more web applications 140 and one or more SIP applications 144. However, the servers 108 are not required, and in this example do not, contain an authentication plug-in 136. In accordance with this embodiment, client side authentication plug-in 136 solicits credentials in response to a request associated with the web client 128 or the SIP client 132, whichever comes first, and reuses those credentials for subsequent requests by either the web client 128 or the SIP client 132, even if the later request is in a different context than the first request. Accordingly, the same credentials are applied to different applications 140 and 144 within the same domain for a client device 104. The authentication plug-in 136 can use the uniform resource identifier (URI) associated with the application 140 or 144 to which access is requested, in conjunction with web and SIP application awareness, without requiring support from a server 108 with respect to collecting the required credentials and related information. The credentials can then be provided as part of or following a first request 204 for access to an application 140 or 144 associated with a first server 108*a*. In connection with a second request 404, either to the first server 108*a* or the second server 108*b*, the credentials collected by the authentication plug-in 136 on the client device 104 in connection with the initial request can be reused. Moreover, the subsequent request can be for an application 140 or 144 in a different context than the original request.

Figure 5:
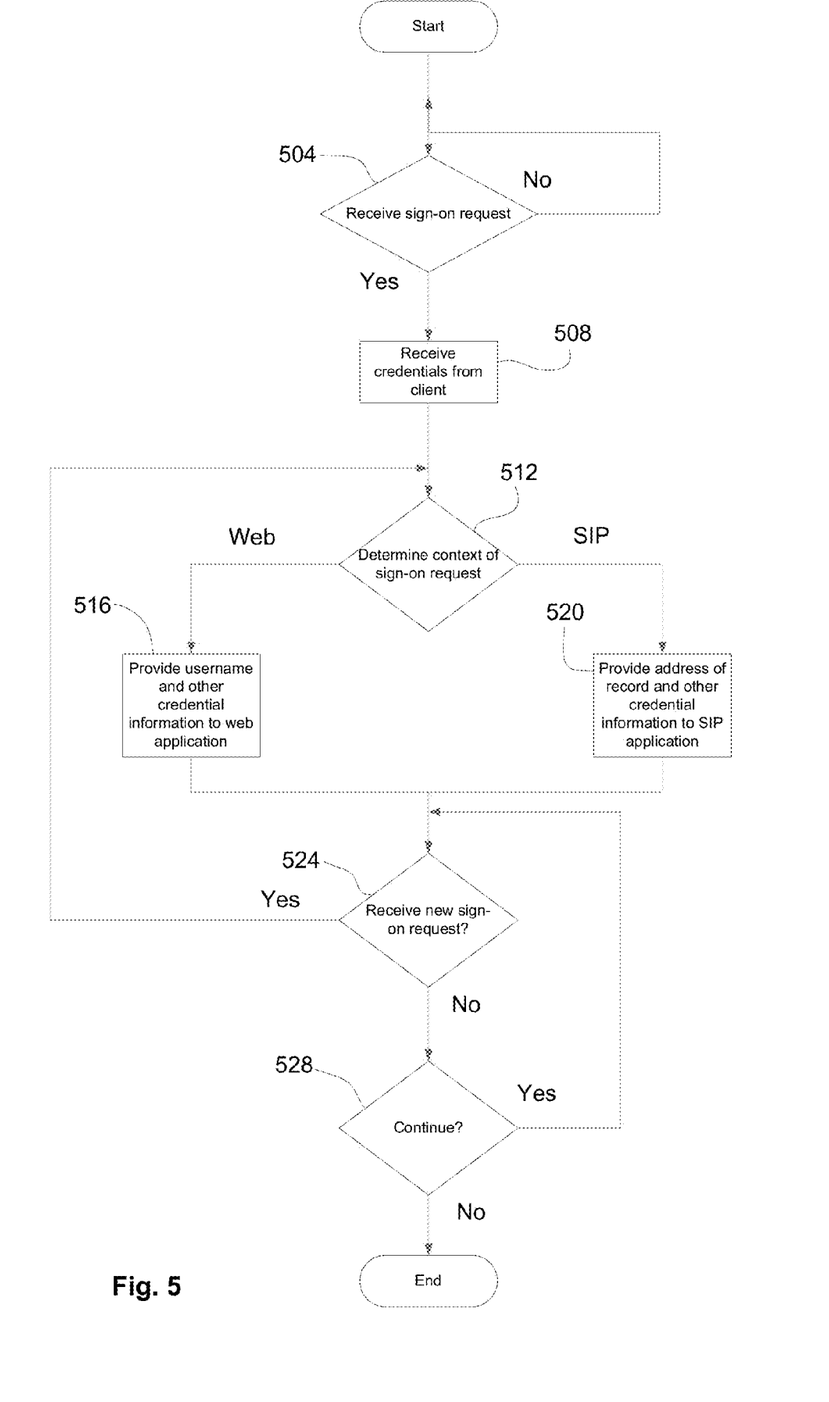
FIG. 5 is a flowchart illustrating aspects of an authentication method in accordance with embodiments of the present disclosure.

With reference now to FIG. 5, aspects of an authentication method in accordance with embodiments of the present disclosure are depicted. Initially, at step 504, a determination is made as to whether a sign-on request in association with a web client 128 or a SIP client 132 is received. Until such a request is received, the process can idle at step 504. After a sign-on request is received, the client is queried for authentication credentials necessary to support the request (step 508). The query can require a user associated with the client device 104 to enter authentication credential information, or can be handled by application programming (e.g., the web client 128 or SIP client 132) running on the client device 104. In addition, the authentication credential information can be placed in a cache maintained by the authentication plug-in 136. At step 512, the context of the sign-on request is determined. For example, an initial request for access to an application 140 or 144 will contain header information identifying the context (i.e., the transport or protocol interface, for instance HTTP or SIP) of the application 140 or 144. In a subsequent request for access the authentication plug-in 136 needs an awareness of the context of the application 140 or 144 to which access is requested, in order to map the credentials obtained in connection with the original request to the context appropriate to the subsequent request. Where the request is for access to a web application, the user name and other credential information is provided to that web application 140 (step 516). Where the request is for access to a SIP application, the address of record and other credential information is provided to the SIP application 144 (step 520). In response to the provided credentials, the client device 104, and in particular the web client 128 or SIP client 132, as appropriate, is granted access to the requested application 140 or 144.

At step 524, a determination can be made as to whether a new sign-on request or request for access to an additional web application 140 or SIP application 144 has been received by the authentication plug-in 136. When a new sign-on request is received, the process can return to step 512, to determine the context of the sign-on request. In connection with the subsequent request, the sign-on credentials originally received in connection with the first or initial request are reused. In particular, the sign-on credentials are taken from the authentication plug-in 136 cache. Moreover, the various web applications 140 and SIP applications 144 available to the web client 128 and/or SIP client 132 are configured to use the same authentication mechanism. Accordingly, a single sign-on is provided to a user of a client device 104 in a converged system 100.

If a request for a new sign-on request is not received, a determination can be made as to whether the process should be continued (step 528). If the process should continue, it can return to step 524, to look for a new sign-on request. Alternatively, the process may end.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for facilitating client authentication in a communication system, comprising: providing a first authentication plug-in;
   receiving a first request for first sign in credentials from a first application associated with a first protocol in connection with a first request from a first client device;
   providing the first sign in credentials to the first application in response to the first request for sign in credentials;
   caching the first sign in credentials by the first authentication plug-in, wherein the first sign in credentials are available to the first authentication plug-in;
   receiving a second request for second sign in credentials from a second application associated with a second protocol in connection with a second request from the first client device; and
   providing at least a portion of the first sign in credentials and the second sign in credentials associated with the second protocol to the second application in response to the second request for sign in credentials, wherein the at least a portion of the first sign in credentials and the second sign in credentials are provided to the second application by the first authentication plug-in, wherein the second request includes a reference to the first authentication plug-in, and wherein a second authentication plug-in requests authentication from the first authentication plug-in based on the reference to the first authentication plug-in.

2. The method of claim 1, wherein the first protocol is a hypertext transfer protocol (HTTP), and wherein the second protocol is a Session Initiation Protocol (SIP) protocol.

3. A system, comprising:
   a first processor;
   a first data storage, the first data storage including a first authentication plug-in; and
   a data cache, wherein the first authentication plug-in is executed by the first processor and is operable to receive first credential information in relation to a first request by a first client device for access to a first application associated with a first protocol and to place the first credential information in the data cache, and wherein the first authentication plug-in is further operable to provide at least a portion of the first credential information and a second credential information associated with a second protocol in relation to a second request by the first client device for access to a second application associated with the second protocol, wherein the second request includes a reference to the first authentication plug-in, and wherein a second authentication plug-in requests authentication from the first authentication plug-in based on the reference to the first authentication plug-in.

4. The system of claim 3, wherein the first client device is one of a soft client and a hardware client, wherein the first application is a hypertext transfer protocol (HTTP) application, and wherein the second application is a Session Initiation Protocol (SIP) application.

5. The system of claim 4, wherein the first client device is a hardware client.

6. The system of claim 3, further comprising:
a first server, wherein the first processor and the first data storage are included in the first server, and wherein the first application is resident on the first server;
a second server, including:
a second processor;
second data storage, the second data storage including a second authentication plug-in and the second application, wherein the second application is resident on the second server, and wherein the first authentication plug-in provides the first credential information to the second authentication plug-in.

7. A non-transient computer readable medium having stored thereon computer executable instructions, the computer executable instructions causing a processor to execute a method for providing authentication information, the computer executable instructions comprising:
instructions to, in response to a first request from a first application for first credential information related to a client requesting access to the first application associated with a first protocol, cache the first credential information and, in response to a second request from a second application for second credential information related to the client requesting access to the second application, provide at least a portion of the first credential information and the second credential information associated with a second protocol to the second application associated with the second protocol, wherein the second request includes a reference to a first authentication plug-in, and wherein a second authentication plug-in requests authentication from the first authentication plug-in based on the reference to the first authentication plug-in.

8. The method of claim 1, wherein the first request for the first sign in credentials is validated against a user name, wherein the second sign in credentials includes a Session Initiation Protocol (SIP) address of record, and wherein the second sign in credentials have not been provided by a user.

9. The method of claim 1, wherein the reference is in a form of a server signed hash of an authorization header.

10. The system of claim 3, wherein the reference is in a form of a server signed hash of an authorization header.

11. The computer readable medium of claim 7, wherein the reference is in a form of a server signed hash of an authorization header.

12. The system of claim 3, wherein the first request is validated against a user name, wherein the second credential information includes a Session Initiation Protocol (SIP) address of record, and wherein the second credential information has not been provided by a user.

13. The computer readable medium of claim 7, wherein the first request is validated against a user name, wherein the second credential information includes a Session Initiation Protocol (SIP) address of record, and wherein the second credential information has not been provided by a user.

14. The computer readable medium of claim 7, wherein the first protocol is a hypertext transfer protocol (HTTP), and wherein the second protocol is a Session Initiation Protocol (SIP).

15. The method of claim 1, further comprising a Java authentication and authorization service (JAAS) authentication layer to converge digest authentication methods for the first application and the second application.

16. The system of claim 3, further comprising a Java authentication and authorization service (JAAS) authentication layer to converge digest authentication methods for the first application and the second application.

17. The computer readable medium of claim 7, further comprising instructions for a Java authentication and authorization service (JAAS) authentication layer to converge digest authentication methods for the first application and the second application.

18. The method of claim 1, wherein the first application is a Simple Object Access Protocol (SOAP) application.

19. The system of claim 3, wherein the first application is a Simple Object Access Protocol (SOAP) application.

20. The computer readable medium of claim 7, wherein the first application is a Simple Object Access Protocol (SOAP) application.

* * * * *